United States Patent
Pham et al.

(10) Patent No.: US 9,114,714 B2
(45) Date of Patent: Aug. 25, 2015

(54) HIGH VOLTAGE CHARGE PACK

(71) Applicant: Ford Global Technologies, LLC, Dearborn, MI (US)

(72) Inventors: Thanh D. Pham, Canton, MI (US); Tuyen Quoc Tran, Dearborn, MI (US); Ben A. Tabatowski-Bush, South Lyon, MI (US); Shane Schulze, Ypsilanti, MI (US); Kevin Vander Laan, Bloomfield Hills, MI (US); Jesus Cardosa, Allen Park, MI (US); Richard Kai Wong, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 13/628,121

(22) Filed: Sep. 27, 2012

(65) Prior Publication Data
US 2014/0084843 A1    Mar. 27, 2014

(51) Int. Cl.
*H02J 7/14* (2006.01)
*B60L 11/18* (2006.01)
*B60L 3/00* (2006.01)

(52) U.S. Cl.
CPC ......... *B60L 11/1816* (2013.01); *B60L 11/1824* (2013.01); *B60L 11/1864* (2013.01); *B60L 3/003* (2013.01); *B60L 2210/14* (2013.01); *B60L 2230/16* (2013.01); *B60L 2240/525* (2013.01); *Y02T 10/7005* (2013.01); *Y02T 10/7016* (2013.01); *Y02T 10/7061* (2013.01); *Y02T 10/7088* (2013.01); *Y02T 10/7225* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01)

(58) Field of Classification Search
CPC . Y02T 10/7016; Y02T 10/7005; Y02T 90/14; Y02T 90/16; B60L 11/1816; B60L 11/1824; B60L 11/1864
USPC .......... 320/101, 102, 103, 104, 140
See application file for complete search history.

(56) References Cited

U.S. PATENT DOCUMENTS

| | | |
|---|---|---|
| 6,281,660 B1 | 8/2001 | Abe |
| 6,476,571 B1 | 11/2002 | Sasaki |
| 6,664,757 B1 | 12/2003 | Gauthier et al. |

(Continued)

FOREIGN PATENT DOCUMENTS

JP    2000-153465    6/2000

*Primary Examiner* — Helen Rossoshek
(74) *Attorney, Agent, or Firm* — Maristyn Law LLC; Lynda F. Kouroupis; David B. Kelley

(57) ABSTRACT

A portable high voltage charging apparatus (HVCA) can be configured to controllably charge a hybrid electric vehicle (HEV) traction battery using energy provided by a low voltage (LV) lead acid vehicle battery. An HVCA can include a DCDC converter configured to boost a lower input voltage from the LV battery to a higher output voltage provided to the HV battery. The HVCA can be configured with a traction battery interlock, allowing offline charging of the traction battery. In an example embodiment, an HVCA can be configured to communicate with an HV battery control module via a CAN bus. An HVCA can be configured to transfer energy to the HV battery for a predetermined time period, then automatically stop the transfer process. An HVCA can be configured to receive user input to start and/or stop a charging process. An example embodiment can include a supplemental charger to boost LV battery voltage.

20 Claims, 4 Drawing Sheets

(56) References Cited

U.S. PATENT DOCUMENTS

| | | | |
|---|---|---|---|
| 6,791,295 B1* | 9/2004 | Berels | 320/103 |
| 7,835,831 B2* | 11/2010 | Chung et al. | 701/22 |
| 8,143,843 B2* | 3/2012 | Ichikawa | 320/104 |
| 8,354,818 B2* | 1/2013 | Louch et al. | 320/101 |
| 8,461,808 B2* | 6/2013 | Ohta et al. | 320/140 |
| 8,575,897 B2* | 11/2013 | Masuda | 320/134 |
| 8,692,512 B2* | 4/2014 | Tanikawa et al. | 320/109 |
| 2006/0214637 A1* | 9/2006 | Gonzales et al. | 320/128 |
| 2009/0001926 A1* | 1/2009 | Sato | 320/102 |
| 2009/0079389 A1* | 3/2009 | Ohtomo | 320/109 |
| 2009/0103341 A1* | 4/2009 | Lee et al. | 363/124 |
| 2010/0121507 A1* | 5/2010 | Ishii et al. | 701/22 |
| 2011/0012553 A1* | 1/2011 | Sloan et al. | 320/105 |
| 2011/0169448 A1* | 7/2011 | Ichikawa | 320/109 |
| 2012/0065824 A1 | 3/2012 | Takahashi et al. | |
| 2012/0068663 A1* | 3/2012 | Tanikawa et al. | 320/109 |
| 2012/0133322 A1* | 5/2012 | Walsh et al. | 320/101 |
| 2012/0200263 A1* | 8/2012 | Masuda | 320/130 |
| 2013/0038271 A1* | 2/2013 | Park | 320/104 |
| 2013/0187590 A1* | 7/2013 | Ferrel et al. | 320/104 |
| 2013/0264975 A1* | 10/2013 | Kaita et al. | 318/139 |
| 2014/0095018 A1* | 4/2014 | Atluri et al. | 701/36 |
| 2014/0184141 A1* | 7/2014 | Loftus et al. | 320/104 |
| 2014/0312685 A1* | 10/2014 | Moga | 307/9.1 |

* cited by examiner

HIGH VOLTAGE CHARGE PACK

FIELD OF INVENTION

This invention relates generally to a charging apparatus for an electrified vehicle, and more particularly to a means and method for charging a high voltage battery using a low voltage battery.

BACKGROUND OF INVENTION

Electrified vehicles reduce both fuel consumption and exhaust emissions by employing electric drive systems energized by a high voltage (HV) energy storage device (ESD) such as an HV battery. Battery electric vehicles (BEVs) and Plug-in electric vehicles (PEVs) may be designed to rely totally on electric motoring power, while hybrid electric vehicles (HEVs) and plug-in HEVs (PHEVs) may use an electric drive system in conjunction with an internal combustion engine. Unlike a traditional vehicle, in which a low voltage battery provides the energy required to start an engine, an HEV relies on a HV battery or other type of HV ESD to start a vehicle in place of a conventional starter motor to crank the engine. While plug-in vehicles are configured to plug into a wall socket or power grid to recharge a HV battery pack using AC power, standard HEVs are generally not designed with that capability. Rather, an HEV battery is typically charged by the vehicle engine and regenerative braking while the vehicle is being operated. Therefore, when an HEV can't be started, charging its depleted battery can pose a challenge.

In addition to its environmentally friendly features, an HEV can also have several consumer-friendly features. For example, an HEV can have a keyless start feature in which an operator can start the vehicle by either pushing a start button at the dashboard, or by bringing a key fob in proximity of a detector that can start the vehicle as a response to fob detection. While these features can be convenient, they can also unfortunately, facilitate operator carelessness. For example, such features can make it easy for a driver to inadvertently exit and leave an electric vehicle while it is still running. In a traditional automobile, even those that are relatively quiet, the engine can generally be heard inside and outside the vehicle when it is running. Consequently, the likelihood of a driver unwittingly leaving a vehicle when the engine is still operating is relatively low. Furthermore, removal of an ignition key generally requires the engine to be turned off prior to key removal. However, in an HEV in which the electric drive system is running but the engine is not, there is no noise to remind an operator of a parked vehicle that the vehicle drive system is still on and consuming power. In a vehicle in which there is no key to remove after parking, it can be even easier for a driver to forget to turn off the vehicle. Leaving a vehicle on for relatively short periods, for example while grocery shopping or during a shopping expedition at the mall, may not pose a serious problem unless already at a low battery state of charge. However, leaving it parked and turned on for an extended period can discharge the high voltage battery to a point that it can no longer start the vehicle. For example, in his hurry to catch a flight at an airport, a driver may park his vehicle, quickly unload his baggage, and scramble to the terminal. In his haste, he could completely forget to power off his HEV. Upon his return 4-5 days later he may be unable to crank the engine because the HV battery voltage is below the minimum required to start the vehicle. Unlike the owner of a BEV or PHEV who can plug his vehicle to a public charging grid at the airport to recharge a battery, an HEV owner will have to seek outside help. Much to his chagrin, particularly if it is late at night, he will have to contact a roadside assistance service that can dispatch a service vehicle equipped to charge the depleted battery or tow to a vehicle dealership. A similar situation can arise under other circumstances, such as when the vehicle is inadvertently left on at home, when there is a battery malfunction, or while the vehicle is being repaired at a service facility. Battery charging equipment can often include a voltage converter adapted to charge a battery. A mechanical interlock may be used to connect the equipment with the depleted HV battery. One of the primary drawbacks of current recharging methods is that the HV battery is charged while it is connected to one or more vehicle components or systems, i.e., the HV battery is "on-line" in order to receive the necessary control messages required to allow and enable battery charging.

BRIEF SUMMARY OF THE INVENTION

An example system can include a high voltage charging apparatus (HVCA), a low voltage (LV) ESD configured to provide energy to the HVCA, and a high voltage (HV) ESD having a voltage level to be boosted. The HVCA can be configured to receive current from the LV ESD and provide current to the HV ESD. By way of example, but not limitation, an HV ESD can be embodied as an HV lithium-ion HEV battery pack, and an LV ESD can be embodied as a low voltage battery, such as a 12V lead acid vehicle battery. An example system can further include a supplemental charger configured to boost the voltage of the LV ESD. In an example system, an HVCA can be configured to communicate with a control module for an HV ESD so that the HV ESD can be charged while it is offline, disconnected from any vehicle load.

In an example embodiment, an HVCA can include a booster pack, means for electrically connecting the booster pack to an HV ESD, and means for electrically connecting the booster pack to an LV ESD. An example booster pack can include a DCDC converter configured to convert a lower input voltage to a higher output voltage, and a communications module configured to communicate with a control module for the HV ESD. In an example embodiment, a communications module can comprise a control area network (CAN) controller transmitter configured to cooperate and communicate with a CAN controller at an HV ESD control module via a CAN bus.

A booster pack can further include a control module configured to coordinate and control operation of the HVCA. For example, a control module can comprise a microprocessor electrically coupled to various booster pack components. In addition, an HVCA booster pack can comprise a user interface module configured to receive input from a user. The user interface module can further include an indicator configured to indicate one or more operational aspects of the HVCA or other system component to a user. In an example embodiment, an indicator can comprise a lamp that is illuminated when the HVCA is powered on. By way of further example, an indicator can comprise a display, such as an LED display, that can convey one or more HV ESD parameters, such as real-time voltage and/or SOC.

An example method for charging an HV ESD can include coupling an HVCA to a control module for an HV ESD, coupling an HVCA to an LV ESD, and coupling an HVCA to a HV ESD. A method can continue with receiving user input. For example, a user can turn on an HVCA. An example method can also include the HVCA communicating with the HV ESD control module, by way of example, but not limitation, via a CAN bus. A method can continue with the transfer of energy to the HV ESD. An example method can include terminating energy transfer after a predetermined time period or after transfer of a predetermined amount of energy.

DETAILED DESCRIPTION OF EXAMPLE EMBODIMENTS

As required, example embodiments of the present invention are disclosed. The various embodiments are meant to be non-limiting examples of various ways of implementing the invention and it will be understood that the invention may be embodied in alternative forms. The present invention will be described more fully hereinafter with reference to the accompanying drawings in which like numerals represent like elements throughout the several figures, and in which example embodiments are shown. The figures are not necessarily to scale and some features may be exaggerated or minimized to show details of particular elements, while related elements may have been eliminated to prevent obscuring novel aspects. The specific structural and functional details disclosed herein should not be interpreted as limiting, but merely as a basis for the claims and as a representative basis for teaching one skilled in the art to variously employ the present invention. For example, while the exemplary embodiments are discussed in the context of a vehicle, it will be understood that the present invention is not limited to that particular arrangement. In addition, actions described as part of a method or process, may be described in a particular sequence for the sake of teaching the practice of the invention. However, such description should not be interpreted as limiting the invention to a particular example sequence, as actions may be performed concurrently or in alternate sequences.

Figure 1:
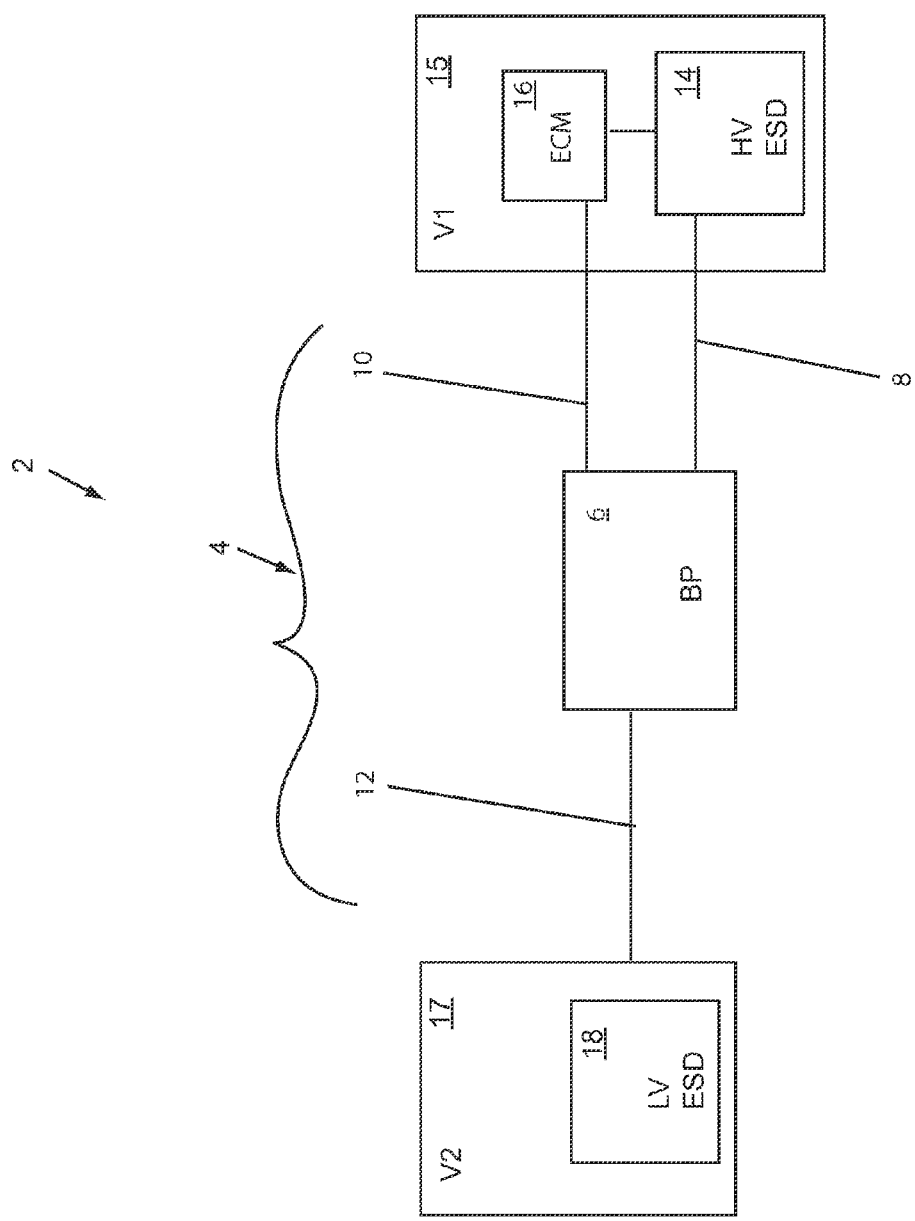
FIG. 1 shows an example system for charging a HV ESD.

Turning now to the several Drawings in which like reference numerals refer to like elements throughout, FIG. 1 shows a block diagram of an example system 2, in which a high voltage (HV) charging apparatus (HVCA) 4 can be configured to charge a HV energy storage device (ESD) (HV ESD) 14 by using a low voltage (LV) ESD (LV ESD) 18. In an example system, the HV ESD 14 can be part of an electric drive system (EDS) at a first vehicle 15. For example, the first vehicle 15 can be in the form of a hybrid electric vehicle (HEV) having an HV ESD embodied as an HV traction battery configured to provide energy for an HEV EDS. By way of example, but not limitation, an HV traction battery can be configured to have a voltage approximately to 300 volts across its terminals when it is fully charged and operational.

In an example system, the LV ESD 18 can be embodied as a traditional low voltage lead acid battery, having a nominal voltage of around 12-15V, disposed at a vehicle 17. The vehicle 17 can be a traditional vehicle having an internal combustion engine (ICE), or an electrified vehicle, such as a battery electric vehicle (BEV), a hybrid electric vehicle (HEV) or a plug-in HEV (PHEV). In an example embodiment, the vehicle 17 is a service vehicle equipped with a 15V lead acid battery.

Under various circumstances the HV ESD 14 can become depleted to the point that it is no longer able to provide the energy necessary start the engine. For example, a driver can leave the vehicle 15 turned ON and unattended for an extended period, such as a multi-day stay at an airport parking lot. Alternatively, an HV ESD can be come depleted while a vehicle is being serviced or as a result of a battery malfunction. When the HV ESD 14 is configured to provide the nominal voltage described above, but is depleted to the point that its voltage falls below around 220V, it may no longer be able to start the vehicle 15. The same problem can occur when the state of charge (SOC) at the HV ESD 14, which should greater than 35%, falls to 0%.

In circumstances in which the HV ESD 14 is depleted to the point that it can no longer start the vehicle 15, the HVCA 4 can be used to boost the HV ESD 14 voltage and/or SOC to a higher level. In an example embodiment, the HVCA 4 can be configured to charge the HV ESD 14 offline, allowing the HV ESD 14 to be disconnected from other vehicle systems and loads during the recharging process. Thus a system of the invention can be configured to provide a safe, effective, and relatively quick alternative to the charging systems and protocols currently employed in the art that charge an HV ESD while it is online. In an example embodiment, the HVCA 4 can comprise a portable booster pack 6, a means 8 for electrically coupling said booster pack 6 to the HV ESD 14, a means 10 for electrically coupling said booster pack 6 to an ESD control module (ECM) 16 associated with said HV ESD 14, and a means 12 for electrically coupling said booster pack 6 with the LV ESD 18. The HVCA 4 can be configured to receive energy from the LV ESD 18 and provide energy to the HV ESD 14 to boost its voltage to a level at which it can start the vehicle 15. Advantageously, the HVCA 4 can be configured to bypass a vehicle interlock device. In prior art systems, turning an ignition key in a dead vehicle prompted transmission of a vehicle-generated CAN message to an ECM for charging of an HV ESD. As will be described below, the HVCA 4 can be configured to transmit the required control messages for the ECM 16.

Figure 2:
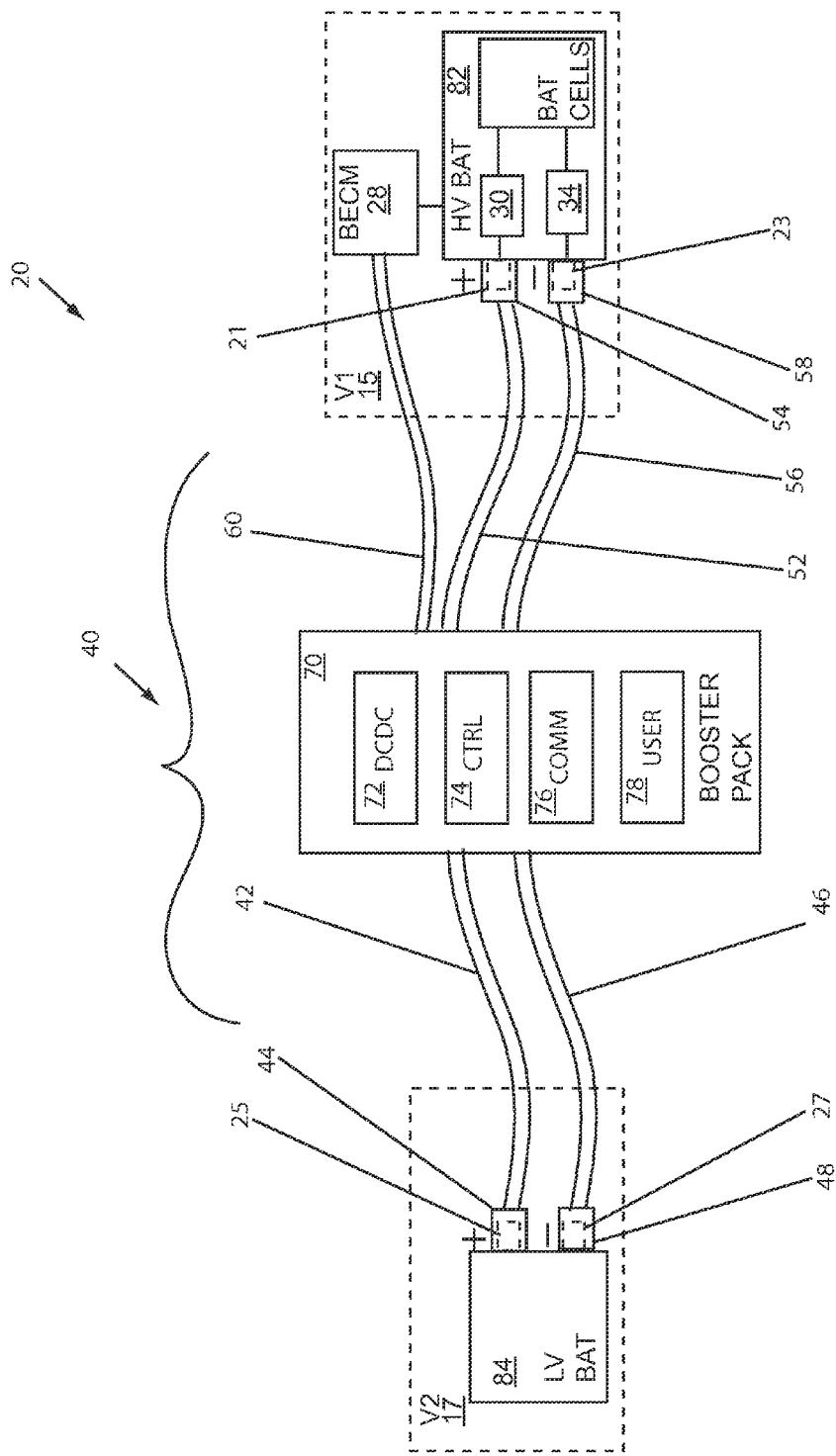
FIG. 2 shows an example system for charging a HV ESD.

FIG. 2 shows an example system 20 comprising an example HVCA 40. In this example, an LV ESD is embodied as an LV battery 22 having a positive terminal 23 and a negative (or ground) terminal 24. Similarly, an HV ESD is embodied as an HV battery 26 having a positive terminal 25 and a negative or ground terminal 26. The ECM 16 can be embodied as a battery energy control module (BECM) 28 that is configured to control one or more aspects of the HV battery 26 operation. In an example embodiment, the BECM 28 can be configured to cooperate with other modules and systems at the vehicle 15. For example, the BECM 28 can be configured to transmit and receive communication and control signals over a controller-area-network (CAN) bus (not shown) at the vehicle 15.

As known in the art, a CAN bus is a serial bus system designed to network intelligent devices. It is often used in automotive systems to communicatively link electronic devices while avoiding the complexity and cost of point-to-point wiring systems. Robust and reliable, a CAN network enables devices to communicate through a single electronic control unit (ECU) interface that obviates the need for analog inputs to every device. Every device coupled to a CAN network can comprise a CAN controller chip, and can receive all messages transmitted over a CAN bus. The CAN controller chip can determine whether a CAN message is relevant to the device with which it is associated. Both high speed and low speed CAN standards have been established. For additional information on CAN network implementations and protocols, please see "Introduction to the Controller Area Network (CAN)", Application Report SLOA 101 by Steve Corrigan, August 2002, published by Texas Instruments which is incorporated herein in its entirety by reference. In an example embodiment, in response to receiving one or more particular CAN messages, the BECM 28 can be configured to control closure of one or more relays that enable the HV battery 26 to receive charge from a charging device. For example, relays 30 and 34 can be closed to couple the HV battery 26 cells to a charging device for the HV battery 26.

The example HVCA 40 can comprise a booster pack 70 having cables and connectors configured for connecting to a low voltage ESD and a high voltage ESD. For example, the HVCA 40 can comprise a cable 42 having a connector 44 configured to couple to the positive terminal 25 at the LV battery 26, a cable 46 having a connector 48 configured to couple to the negative terminal 27 at the LV battery 26, a cable 52 having a connector 54 configured to couple to the positive terminal 21 at the HV battery 24, and a cable 56 having a connector 58 configured to couple to the negative terminal 23 at the HV battery 24. The example HVCA can also comprise one or more leads or cables 60 configured to couple with a BECM 28. It is understood that OEM ECM equipment may differ for particular vehicle makes and models. As a result, interfaces, cables and connectors configured to couple an HVCA to an ECM, an HV ESD and a LV ESD may differ as HVCAs can be customized for particular OEMs.

In an example embodiment, the booster pack 70 can comprise a DCDC converter module 72, a controller module 74, a communications module 76 and a user interface module 78. The DCDC converter module 72 can comprise a DCDC converter configured to convert an input voltage to a higher output voltage. The controller module 74 can comprise hardware, software, firmware or some combination thereof. In an exemplary embodiment, the controller module 74 can comprise a programmable microcontroller or microsequencer configured to control and/or coordinates various operations of the HVCA 40. In an example embodiment, the communications module 76 can be configured to communicate with the BECM 28 at the vehicle 15. By way of example, the communications module 76 can comprise a CAN controller/transmitter 77 configured to transmit one or more CAN control messages to a CAN controller at the BECM 28. For example, the communications module 76 can be configured to send a CAN message to the BECM 28 to close the contactors 30 and 34 so that current can flow from the HVCA 40 to charge the HV battery 14. The user module 78 can comprise a user input means, such as a power button for turning the HVCA 40 on and off, and may further comprise an indicator, such as a lamp, LED or other device to indicate that the HVCA is powered and/or operating. In a further embodiment, the user module 78 can comprise means for displaying an HV battery 14 characteristic, such as its current voltage or SOC.

Figure 3:
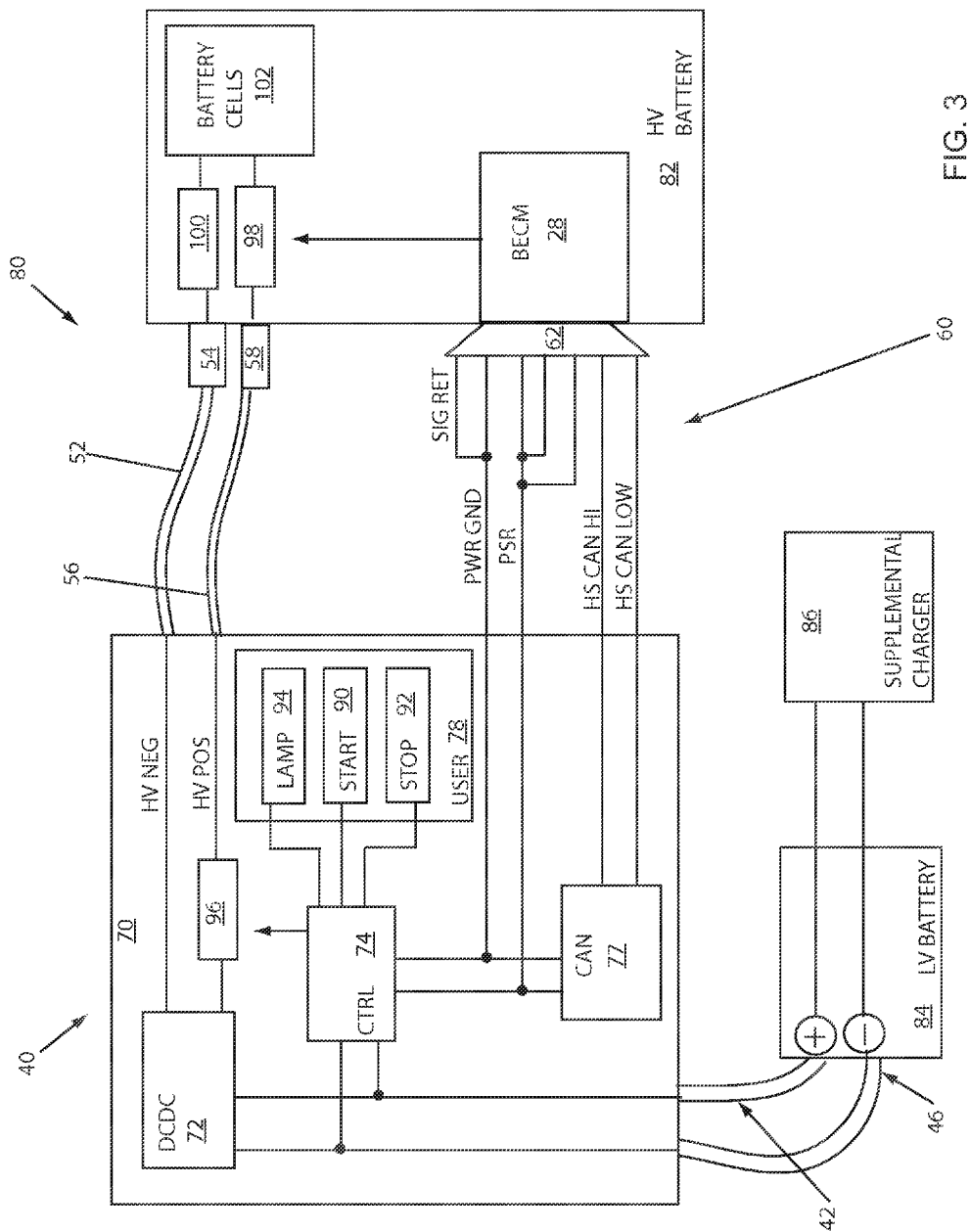
FIG. 3 depicts an example High Voltage Charger Pack (HVCA) for charging an HV ESD.

FIG. 3 shows an example system 80 for charging an HV ESD. In this example, an HVCA 40 is arranged to charge an HV battery 82 using energy from a LV battery 84. The LV battery 84 can be embodied as a lead acid battery configured to provide a voltage of around 12V. In an example embodiment, the LV battery 84 and the HV battery 82 can be at the same vehicle. For instance, while the HV battery 82 can be depleted to the point that it cannot start an engine, it is possible that the LV battery 84 remains sufficiently functional to provide energy for a charging process. Alternatively, as discussed above, the LV battery 84 may be at a separate vehicle. A supplemental charger 86 can be coupled to the LV battery 84 to boost the LV battery 84 voltage. In an example embodiment, the supplemental charger can be embodied as a low voltage charger, such as the Midtronics® GR1 Diagnostics Conductance Charger, and configured to increase the LV battery 84 voltage from 12 to 15V. The supplemental charger 86 can be of particular benefit when the LV battery 84 and the HV battery 82 are at the same vehicle, since LV batteries at an HEV are typically only used to supply power to various electronic modules and can be relatively weak. However, it is contemplated that a supplemental charger can be used with an LV battery of a separate vehicle, or, as shown in previous figures, not used at all.

The HVCA 40 can include several leads, cables, connectors, and the like for connecting to the HV and LV components of the system 80. The cables 52 and 56, having connectors 54, 58 respectively, can be configured to couple the booster pack 70, and in particular the DCDC converter module 72, with external positive and negative terminals (not shown) at the battery 82. Cables 42 and 46 can be configured to couple the booster pack 70, for example the DCDC converter module 72, with the LV battery 84. Connectors 44, 48, 54, 58 can be in any form compatible with the HV and LV batteries 82, 84 and configured to provide sufficient electrical connectivity. As discussed previously herein, HVCA's can be adapted for various OEM equipment. In an example embodiment, one or more cables, wires or leads, cumulatively referred to by the reference numeral 60, can couple the booster pack 70 with the BECM 28 via a BECM interface connector 62. By way of example, CAN High and Low signal leads can extend between the booster pack 70 and the BECM connector 62 to enable transmission of CAN signals between the CAN controller 77 and the BECM 28 as known in the art. In addition, power ground and power supply relay (PSR) leads can couple the booster pack 70 and the BECM 28 to provide power and signal return capability.

A user interface module at an HVCA can be configured to receive user input as well as provide user output. As shown in FIG. 3, the example user interface module 78 can comprise a start button 90 and a stop button 92, configured to allow a user to start and stop HVCA 12 operation. A lamp 94 can be included to indicate the HVCA 12 operational state. As mentioned previously herein, additional user interface features can be provided. However, it is preferable to limit HVCA 12 power consumption, directing energy instead to the charging process to reduce the HV battery charging time.

Within the booster pack 70, the control module 74 can be configured to control and coordinate various aspects of the charging process, such as, but not limited to, communication between booster pack 70 and the BECM 28, and current flow between the DCDC converter 72 and the HV battery 82. In an example embodiment, the control module 74 can comprise a programmable microcontroller or microsequencer, and can be powered by the LV battery 84. The control module 74 can be configured to prompt the CAN controller 77 to initiate communication with the BECM 28. In addition, the control module 74 can be configured to control the closing of a relay configured to couple DCDC converter output with one or more HVCA output cables. For example, a relay 90 can be disposed at DCDC converter 72 output. In an example embodiment, the control module 74 can be configured to close the relay 90 for a predetermined period of time, and then permit the relay to reopen to prevent HV battery 82 charging. Limiting the charging process to a predetermined interval can enable the DCDC converter 72 to provide energy to the HV battery 82, and, at the same time, offer protection against inadvertent overcharging. If the HV battery 82 is not sufficiently charged at the completion of the time period, a user can initiate a subsequent charging period. It is further contemplated that a predetermined measure other than time can be used. For example, a charging interval can be defined by the transfer of a predetermined amount of energy.

Figure 4:
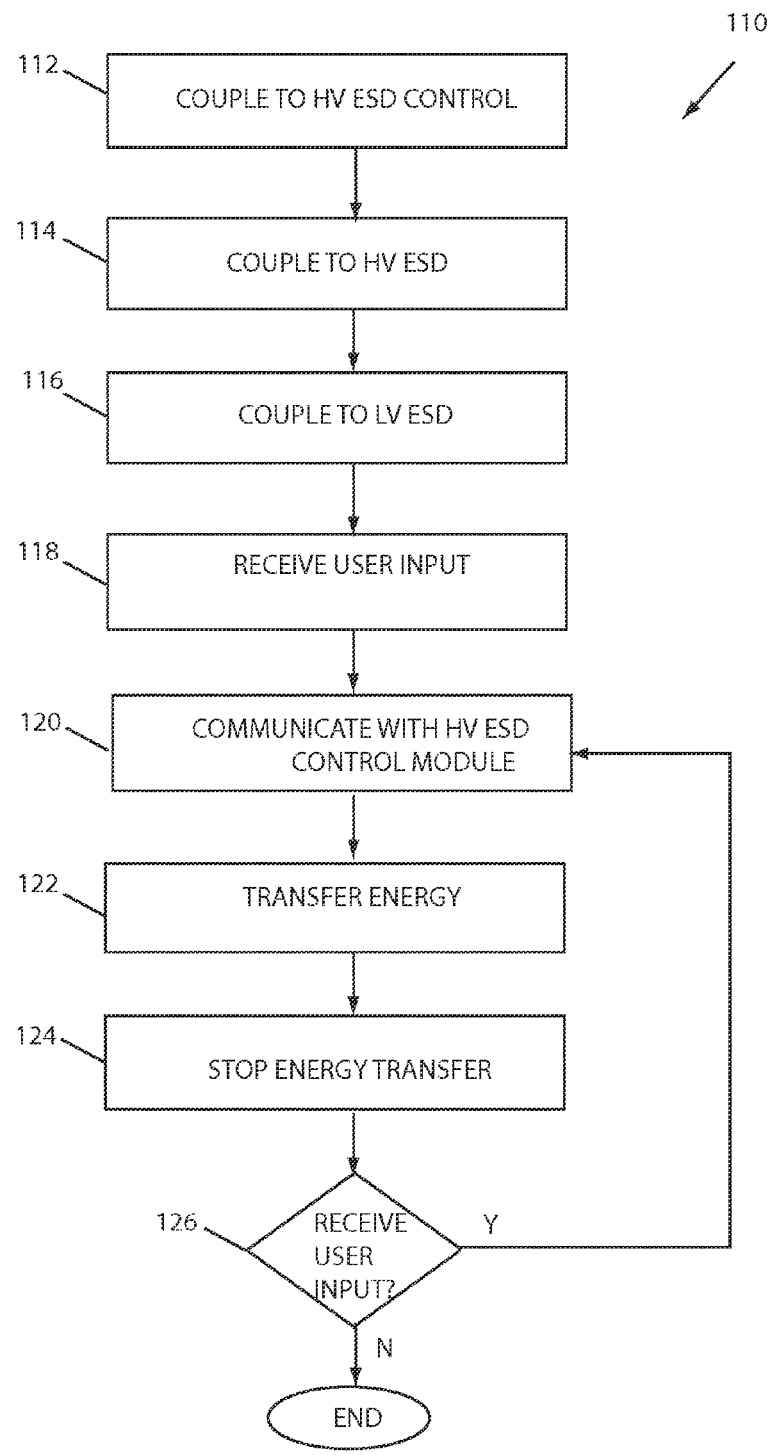
FIG. 4 shows an example method for charging a HV ESD.

FIG. 4 depicts a flow diagram for an example method 110 for charging an HV ESD with an HVCA. At block 112 an HVCA can couple to a control module associated with an HV ESD. For example, the leads 60 from the booster pack 70 can be inserted into the connector/interface 62 for the BECM 28. Communicative coupling to a BECM 28 enables the HV battery 82 to be serviced offline, a distinct advantage of the invention over prior art systems. At block 114, an HVCA can couple to an HV ESD. By way of example, the HV battery 82 can be disconnected from its vehicle load. The cables 52 and 56 with caps 54, 58 respectively can be connected to external positive and negative terminals (not shown) of the HV battery 82.

At block 116, an HVCA can couple to an LV ESD that may be connected to a supplemental charger. Whether a supplemental charger is included can depend on the condition and characteristics of an LV ESD. By way of example, the cables 42 and 46 can be connected to the positive and negative terminals respectively of the LV battery 84. LV ESD coupling can provide power to a booster pack of an HVCA. An indicator can convey to a user that a booster pack is powered; for example, the lamp 94 may be illuminated. Powering a booster pack can also power an ESD control module, for example, the BECM 28, to which it is coupled. Providing power to an ESD control module can energize or "wake it up", enabling it to communicate with a booster pack as well as perform various battery control operations.

At block 118, an HVCA can receive user input. For example, a user can depress the start button 90. Requiring user input, rather than providing an automated charging process that begins as power is received from a LV ESD, is an additional feature that can be included in the practice of the invention. At block 120, communication with an ESD controller can begin. For example, a microprocessor at the control module 74 can prompt the CAN controller 77 to transmit CAN messages to a CAN controller (not shown) at the BECM 28. In an example embodiment, the CAN controller 77 can initiate a handshaking process to ensure that the BECM 28 is energized and responsive. For example, the BECM 28 can respond to initiation signals from the CAN controller 77 with an acknowledgement or confirmation signal. In an example method, completion of the handshaking process, can lead to an HVCA control module transmitting messages to an ESD controller to close one or more contactor relays that can control the transfer of energy to or from an ESD. By way of example, in some battery configurations, internal relays can control the transfer of energy from external terminals to battery cells. A battery control module can be configured to control the opening and closing of the relays to control energy transfer to/from the cells. Accordingly, in an example method, the CAN controller 77 can send one or more CAN messages, as determined by CAN system protocol, to the BECM 28 to close the contactor relays 98 and 100. Relay closure can allow current provided to the battery 82 external terminals to charge the battery cells 102. In an example embodiment, the CAN controller 77 can be configured to transmit relay control messages for closing contactors at a predetermined rate for a predetermined interval. Preferably, the predetermined rate or frequency is higher than that required by CAN specifications. For example, if a vehicle control network such as a CAN system requires that a relay control message be transmitted every 100 ms, a control module of the invention can be configured to transmit a relay control message every 10 ms. Increasing the transmission rate can increase the probability that an ESD controller will receive the required number of control messages at the required rate to avoid a premature opening of primary ESD relays that can occur in response to a failure to receive an anticipated control message. In an example embodiment, at the end of the predetermined time interval, relay control messages to an HV ESD controller can cease. When an ESD controller no longer receives messages to close a primary relay, it can respond by allowing the relay to open, preventing additional charging of the HV ESD.

At block 122, energy can be provided to an HV ESD. In an example embodiment, an HVCA can controllably provide energy to an HV ESD through a contactor relay. For instance, the control module 74 can be configured to close the relay 96 to allow current to flow through the cable 56 to the HV battery 82. By way of example, output voltage at the DCDC 72 terminals can be around 300V, and the HVCA can be configured to provide a current of around 2 amps to the HV battery 82. Preferably, the contactor relay 96 is closed for a predetermined period of time, then reopened when the time period has elapsed. In an example embodiment, the control module 74 can be configured to close the contactor 96 for a predetermined time period during which the CAN controller 77 transmits "close contactor" control messages to the BECM 28. Accordingly, closure of the contactors 96 at the booster pack 70 and 98, 100 at the HV battery 82 can overlap in time. In an exemplary embodiment, contactor 96 can be closed first, allowing a voltage at the booster pack 70 output to build up prior to the closing of the HV battery relays 98, 100. This aspect is particularly beneficial for those HEV systems that require a minimum voltage to be present at charging terminals for the HV ESD contactors to close properly and remain closed.

At block 124, energy transfer to an HV ESD can terminate. For example, at the completion of a predetermined time period, the control module 74 can open the relay 96 to prevent DCDC converter output from being transferred to the HV battery 82. An example time period can be in the range of 10-15 minutes. In addition, the CAN controller 77 can cease transmitting control messages to the BECM 28 to close contactors. In some vehicles, failure to receive a CAN close contactor message within 100-200 ms can cause primary contactors to open. In response to the absence of such messages, the BECM 28 can stop powering of contactor coils (not shown) associated with the relays 98, 100, allowing them to open and thereby prevent energy from being delivered to HV battery cells 102. It is also noted, that in an example method, a user can stop energy transfer at any time during a charging period by providing user input. For example, a user can press the STOP button 92, which can prompt the control module 74 to open the relay 96, and prompt the termination of CAN messages to the BECM 28 that close the relays 98, 100.

Should an HV ESD require additional charging, a user can depress the start button again to begin another charging interval. A user may choose to charge an HV ESD for more than one interval prior to attempting to start the vehicle. At block 124, a determination can be made as to whether additional user input is received. In an example embodiment, depressing a start button within a predetermined period following completion of a charging interval can initiate a subsequent charging interval while a communication link between an HVCA and an ESD control module remains in effect, obviating the need to repeat a handshaking process. In this scenario, charging can continue at block 120 with transmission of control messages to an ESD controller. Otherwise, the method can end at block 128. It is also contemplated that a user may, after a single charging interval, disconnect an HVCA from an HV ESD, reconnect the HV ESD to the vehicle drive system, and attempt to start the vehicle. If it fails to start, a 112 of the method 110.

It is contemplated that an example HVCA can include additional features as well, such as, but not limited to a temperature sensor, a cooling fan, a user display for conveying HV battery characteristics, etc. A temperature sensor can enable a user to monitor the temperature at the booster pack 70 and take precautions to avoid its overheating. Using a fan to dissipate heat generated by the DCDC converter 72 can protect against overheating and prolong the utility of the HVCA 40. It can also increase the number of consecutive charging intervals that can be performed while maintaining a booster pack 70 temperature in a desired range. In an example embodiment, when a temperature exceeds a maximum threshold, the controller 74 can turn on a fan, and subsequently turn it off when a temperature drops to an acceptable level.

An example HVCA user interface module can include a display, such as, but not limited to, a low-power LED configured to display ESD characteristics. By way of example, the BECM 28 can provide battery 82 characteristics to the booster pack 70, which can be shown on a display. Thus, a user may be able to assess whether an additional charging interval is desired. A further advantage of this feature is that a user may be able to halt a charging process when a desired voltage or SOC is reached, without having to wait until the end of a predetermined charging interval. Incorporation of additional features can also be considered. However, while additional features may be helpful, the anticipated power consumption of each contemplated feature should be carefully considered. Imposition of too many loads on a system LV ESD may impede and slow a charging process.

Thus, the invention provides apparatus, systems and methods for charging an HV ESD using energy provided by a LV ESD. An HVCA can be configured to receive energy from an LV ESD and provide energy to an offline HV ESD in a controlled manner that can safely bring the SOC of depleted HV ESD up to a desired state in a relatively short amount of time. As required, example embodiments have been described herein to fully disclose the invention and its practice. However, it is understood that they are presented for illustrative purposes, and, as such, are not considered to be limitations, as alternate embodiments will likely occur to those skilled in the art. Rather, the scope of the invention is limited only to by the scope of the appended claims.

What is claimed:

1. A system comprising:
    a portable high voltage (HV) charging apparatus (HVCA);
    a low voltage (LV) energy storage device (ESD) at a first vehicle having terminals releasably coupled to said HVCA;
    a high voltage (HV) energy storage device (ESD) at a second vehicle having terminals releasably coupled to said HVCA;
    wherein said HVCA is configured to releasably couple a control module for said HV ESD;
    wherein said HVCA is configured to receive energy from said LV ESD and controllably provide energy to said HV ESD to boost said HV ESD output voltage; and wherein said HVCA is configured to charge said HV ESD while said HV ESD is offline, isolated from electrical components other than said HVCA and said control module.

2. The system of claim 1, wherein said HVCA is configured to communicate with a control module associated with said HV ESD via a controller area network (CAN) bus control message.

3. The system of claim 1, wherein said HV ESD comprises a hybrid electric vehicle (HEV) HV ESD configured to provide motoring power.

4. The method of claim 3, wherein said communicating with said control module comprises transmitting a CAN message.

5. The system of claim 1, wherein said LV ESD comprises a vehicle battery having a nominal voltage no greater than 15V.

6. The system of claim 1, further comprising a supplemental charger configured to boost said LV ESD voltage.

7. The system of claim 1, wherein said LV ESD is disposed at a first vehicle and said HV ESD is disposed at a second vehicle.

8. The system of claim 1, wherein said HVCA is configured to charge said HV ESD while it is offline, isolated from electrical components other than said ECM and said HVCA.

9. A high voltage charging apparatus (HVCA), comprising:
    a self-contained portable booster pack comprising a DCDC converter;
    means for directly and releasably connecting said booster pack to terminals of a high voltage (HV) energy storage device (ESD) at a first vehicle;
    means for directly and releasably connecting said booster pack to terminals of a low voltage (LV) ESD at a second vehicle;
    means for releasably coupling said booster pack to an ESD control module (ECM) associated with said HV ESD;
    wherein said booster pack is configured to receive current from said LV ESD and provide current to said HV ESD to boost said HV ESD voltage;
    wherein said DCDC converter is configured to receive energy directly from said LV ESD and provide energy directly to said HV ESD; and
    wherein said booster pack is configured to communicate with said ECM; and wherein said booster pack is configured to decouple said LV ESD after energy transfer between said LV ESD and said ESD is terminated.

10. The HVCA of claim 9, further comprising a control module configured to enable charging of said HV ESD for a predetermined charging interval.

11. The HVCA of claim 9, further comprising a user input means.

12. The HVCA of claim 9, further comprising an indicator means.

13. The HVCA of claim 9, wherein said booster pack comprises a controllable contactor coupled to said DCDC converter output.

14. A method for charging a high voltage (HV) energy storage device (ESD), comprising:
    a portable HV charging apparatus (HVCA) releasably coupling terminals of an HV ESD at a first vehicle;
    said HVCA releasably coupling terminals of a low voltage (LV) ESD at a second vehicle;
    said HVCA releasably coupling a control module for said HV ESD;
    said HVCA receiving user input;
    said HVCA communicating with said control module associated with said HV ESD; and
    said HVCA transferring energy to said HV ESD through a DCDC converter coupled to said LV ESD and said HV ESD; and said HVCA decoupling said LV ESD after said transfer is terminated.

15. The method of claim 14, wherein said transferring energy to said HV ESD comprises closing an HVCA contactor.

16. The method of claim 14, wherein said transferring energy comprises converting a lower input voltage at said HVCA to a higher output voltage at said HVCA.

17. The method of claim 14, further comprising automatically stopping said energy transfer after a predetermined interval.

18. The method of claim 17, wherein said predetermined interval comprises transfer of a predetermined amount of energy to said HV ESD.

19. The method of claim 17, wherein said predetermined interval is a predetermined time period.

20. The method of claim 14, further comprising said HVCA decoupling said LV ESD after said energy transfer is stopped.

* * * * *

UNITED STATES PATENT AND TRADEMARK OFFICE
CERTIFICATE OF CORRECTION

| | | |
|---|---|---|
| PATENT NO. | : 9,114,714 B2 | Page 1 of 1 |
| APPLICATION NO. | : 13/628121 | |
| DATED | : August 25, 2015 | |
| INVENTOR(S) | : Pham et al. | |

It is certified that error appears in the above-identified patent and that said Letters Patent is hereby corrected as shown below:

On the title page item [75], delete "Jesus Cardosa" and insert --Jesus Cardoso--

Signed and Sealed this
Twenty-second Day of December, 2015

Michelle K. Lee
*Director of the United States Patent and Trademark Office*